(12) United States Patent
Kasevich

(10) Patent No.: US 7,170,294 B2
(45) Date of Patent: Jan. 30, 2007

(54) SUBSURFACE IMAGERY FOR TEMPERATURE MEASUREMENT AND FLUID FLOW FOR OIL RECOVERY USING ELECTROMAGNETIC IMPEDANCE TOMOGRAPHY (EMIT)

(75) Inventor: Raymond S. Kasevich, Mt. Washington, MA (US)

(73) Assignee: KSN Energies, LLC, Great Barrington, MA (US)

( * ) Notice: Subject to any disclaimer, the term of this patent is extended or adjusted under 35 U.S.C. 154(b) by 0 days.

(21) Appl. No.: 11/335,847

(22) Filed: Jan. 19, 2006

(65) Prior Publication Data

US 2006/0170424 A1 Aug. 3, 2006

Related U.S. Application Data

(60) Provisional application No. 60/645,156, filed on Jan. 19, 2005.

(51) Int. Cl.
*G01V 3/08* (2006.01)

(52) U.S. Cl. ..................... 324/338; 324/333

(58) Field of Classification Search ............... 324/338, 324/333
See application file for complete search history.

(56) References Cited

U.S. PATENT DOCUMENTS

| | | | |
|---|---|---|---|
| 4,785,247 A | * | 11/1988 | Meador et al. ............. 324/338 |
| 6,147,497 A | | 11/2000 | Berryman et al. |
| 2004/0140811 A1 | | 7/2004 | Conti |

OTHER PUBLICATIONS

Alumbaugh, David L., et al., "Monitoring Subsurface Changes Over Time with Cross-Well Electromagnetic Tomography", Geophysical Prospecting, 1995, 43,873-902.

Nekut, Anthony G., "Crosswell Electromagnetic Tomography in Steel-Cased Wells", Geophysics, vol. 60 ,No. 3 (May-Jun. 1995) p. 912-920.

* cited by examiner

*Primary Examiner*—Bot LeDynh
(74) *Attorney, Agent, or Firm*—Dorsey & Whitney LLP

(57) ABSTRACT

A new application of electromagnetic tomography is described directly related to the efficient recovery of oil and gas as well the removal of unwanted liquids from subsurface formations. The process involves the deployment of both surface and a single borehole magnetic dipole structures used for both transmitting and receiving low frequency electromagnetic energy. The surface antenna consists of circularly concentric arrays of small receiving solenoid antennas and the downhole system consists of one or more solenoid antenna in a single borehole. The concentricity of the surface array is centered about or in proximity to the borehole axis. The electromagnetic field radiated by the downhole antenna is received by each surface antenna. The amplitude and phase of voltages and currents received by each surface antenna is electronically processed based on the theoretical processing principles similar to what has been recently established for electromagnetic impedance tomography (EMIT). Several concentric surface antenna arrays with electronic switching between each circular array and the downhole solenoid will have the ability to image the spread and movement of oil and gas during thermal treatment and provide three dimensional temperature measurement. The oil movement to recovery wells may be provided by radio frequency heating or steam flood as in enhanced oil recovery. This information allows for developing very efficient oil and fluid recovery techniques by actually observing topographic images developed according to this invention.

9 Claims, 3 Drawing Sheets

SUBSURFACE IMAGERY FOR TEMPERATURE MEASUREMENT AND FLUID FLOW FOR OIL RECOVERY USING ELECTROMAGNETIC IMPEDANCE TOMOGRAPHY (EMIT)

CROSS-REFERENCE TO RELATED APPLICATION(S)

This application claims priority from U.S. provisional patent application No. 60/645,156, which was filed on Jan. 19, 2005, and which is incorporated herein by reference in its entirety.

FIELD OF THE INVENTION

The present invention generally relates to the use of electromagnetic impedance tomography ("EMIT") to track subsurface fluid movement and provide three dimensional temperature measurement. More particularly, this invention relates to systems for using EMIT to create images of the spread and movement of oil and gas during thermal treatment and to provide three dimensional images over a large volume.

BACKGROUND OF THE INVENTION

There is a widespread need for images of subsurface conditions and materials in connection with various industrial applications. Such imaging can be used to map subsurface water movement or mineral deposits. It may also be sued to assist in the recovery of oil or gas, or in environmental remediation efforts.

Electrical Impedance Tomography ("EIT") has been used to provide subsurface imagery between pairs of boreholes for mapping hydraulic conductivity, soils resistivity, mineral deposits, vadose zone water movement, as well as for various medical imagery applications. The technique is generally based on automated measurement and computerized analysis of electrical resistivity changes caused by natural or man-made processes. It is particularly powerful for measuring temporal changes in flow characteristics. To determine resistivity, current is passed through a material such as earth from one electrode pair to another electrode pair either in an adjacent well or in the same well. By making electric potential measurements with both the source and receiver at a number of different positions in their respective boreholes, one can obtain data for a multitude of current paths that cross the region to be imaged.

EIT and its current applications present certain disadvantages, however. For example, temperature information has not been previously considered in such a process. These methods do not take into account or take advantage of the fact that as resistivity changes with heating, the actual temperature of the fluids and other subsurface materials can be determined from such information. Furthermore, the quality and utility of images created using current systems and methods is limited. Conventional cross-borehole EIT methods do not give a three dimensional image over a large volume. They simply image resistivity between boreholes with no complete mapping of the directionality or spreading of fluids with temperature measurement of the heated fluids.

The proposed EMIT system and method in this invention presents an alternative for subsurface imaging. The EMIT system disclosed herein measures the temperatures of the fluids and other subsurface materials of use and analysis during industrial applications. Furthermore, the disclosed system with surface arrays allows for measurements over a full 360 degrees in azimuth from the surface to the desired depth. Thus, the system allows three dimensional images over a large volume.

BRIEF SUMMARY OF THE INVENTION

EMIT is a relatively new impedance imaging method. It has been proposed for use in medical imagery. See Shai Levy, Dan Adam, and Yoram Bresler, "Electromagnetic Impedance Tomogrpahy (EMIT): A New Method for Impedance Imaging," IEEE Transactions on Medical Imaging, Vol. 21, No. 6, June 2002, p. 676. EMIT provides significantly improved visual and quantitative improvement in the image over EIT. This improvement is obtained by performing additional magnetic field measurements on the object boundary and therefore many of the mathematical difficulties in data processing are less as compared with EIT.

The present invention goes beyond conventional EIT methods for subterranean resistivity measurements by employing basically a hybrid measurement scheme involving the simultaneous measurement of both the magnetic and electric fields for image processing. In the present invention, this simultaneous measurement is accomplished by an antenna system (with antennas in both a surface array and borehole) that has the ability to yield values of both components of the electromagnetic field. The solenoid antenna in this proposal is but one example of the antenna possibilities for implementing EMIT.

EMIT has several promising applications. For example, the present invention may be used to create high quality three-dimensional images in order to map subsurface water movement or mineral deposits. It may also be used to more effectively assist in the recovery of oil or gas, or in environmental remediation efforts.

In one embodiment of the present invention, a system may be provided for use in creating images of subsurface materials or structures by electromagnetic impedance tomography. The system may comprise an antenna positioned within a borehole drilled within an area designated for imaging. The antenna may comprise a transmitter for transmitting electromagnetic impedance tomography signals to the surface of the area designated for imaging and a power supply unit to supply power to the transmitter. They system may further comprise a surface terminal positioned on the surface of the area designated for imaging, the surface terminal comprising coil antennas for receiving the transmissions of electromagnetic impedance tomography signals from the transmitter, the coil antennas connected to one another and arranged concentrically in generally circular shapes around the borehole. The system may also comprise a signal processing unit for processing the electromagnetic impedance tomography signals received by the coil antennas and creating images of subsurface materials or structures.

In another embodiment of the present invention, a system may be provided for use in creating images of subsurface materials or structures by electromagnetic impedance tomography. The system may comprise an antenna positioned within a borehole drilled within an area designated for imaging. The antenna may comprise a transmitter for transmitting electromagnetic impedance tomography signals to the surface of the area designated for imaging and a power supply unit to supply power to the transmitter. They system may further comprise a surface terminal positioned on the surface of the area designated for imaging, the surface terminal comprising a first array of coil antennas for receiving electrical signals from the transmitter, the coil antennas connected to one another and arranged concentrically in generally circular shapes around the borehole, and a second array of coil antennas for receiving magnetic signals from the transmitter, the coil antennas connected to one another and arranged concentrically in generally circular shapes around the borehole. The system may also comprise a signal processing unit for processing the electromagnetic impedance tomography signals received by the coil antennas and creating images of subsurface materials or structures.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

The dynamic tracking of subsurface fluid movement and three dimensional temperature measurement based on the change in resistivity or dielectric properties with temperature such as created by borehole selective radio frequency heating or steam drive in a reservoir of heavy crude oil can be provided by the principles of EMIT as described herein. This application requires a special arrangement of borehole and surface antenna structures sufficient in number and distribution to track the movement of the moving fluids during the application radio frequency heating or steam drive ("EMIT Antenna Array"). By providing generally circular arrays of magnetic and electric receiving elements consisting of concentric arrays of increasing diameter and a single transmitting borehole containing a solenoid-like antenna, real time tracking of the direction and spread of the hot fluids can be determined so as to optimize the oil recovery method. The arrangement of receivers on the surface need not always be exactly circular; for example, they may elliptical. Prior to heat application, the position of the crude oil can be determined so that an overall oil recovery strategy can be developed for economic recovery. This same approach can be applied to environmental remediation using radio frequency energy or other heating methods.

Figure 1:
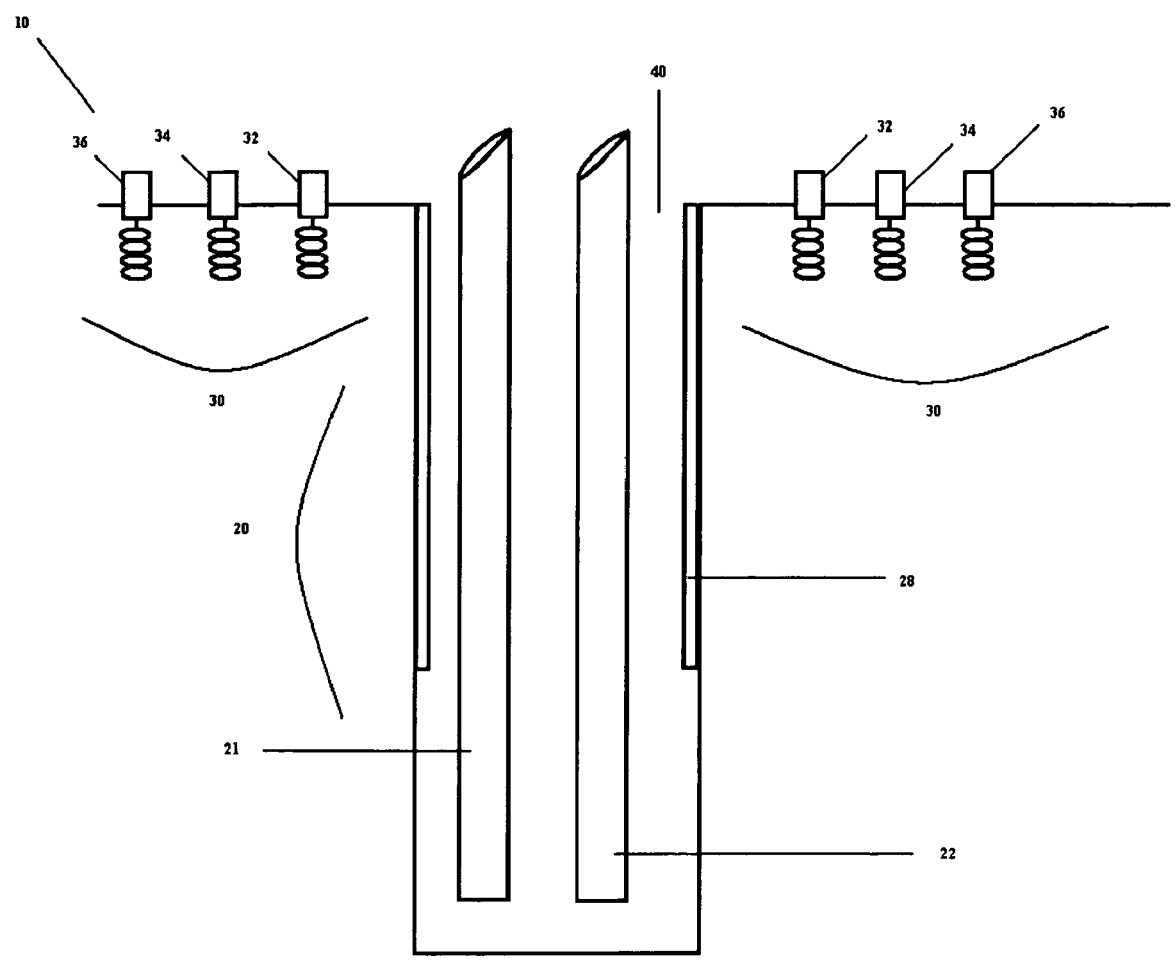
FIG. 1 is a perspective view of an embodiment of the present invention.

FIG. 1 is a perspective view of an embodiment of the present invention. The proposed EMIT System 10 for tracking and sensing in the oil well or remediation environment consists of a bottom terminal 20 and surface terminal 30. The downhole hardware is designed to withstand shock, vibration, abrasion, and thermal environmental conditions.

The bottom terminal 20 consists of two subs 21 and 22. In a typical system these subs may each be approximately 30 feet long. Sub 21 serves the purpose of power supply and incorporates solid-state transmitter electronics. Sub 22 is an iron-core solenoid antenna.

The surface terminal receiver 30 has a number of coil antennas 32 connected together to form a circle around the borehole 40. Additional coil antennas 34 may be connected together to form a larger circle around borehole 40, and additional coil antennas 36 may be connected together to form a still larger circle around borehole 40. In this way, several such larger and larger concentric arrays may be formed. Additionally, the surface antennas may be arranged in such a way as to cancel interference.

Figure 2:
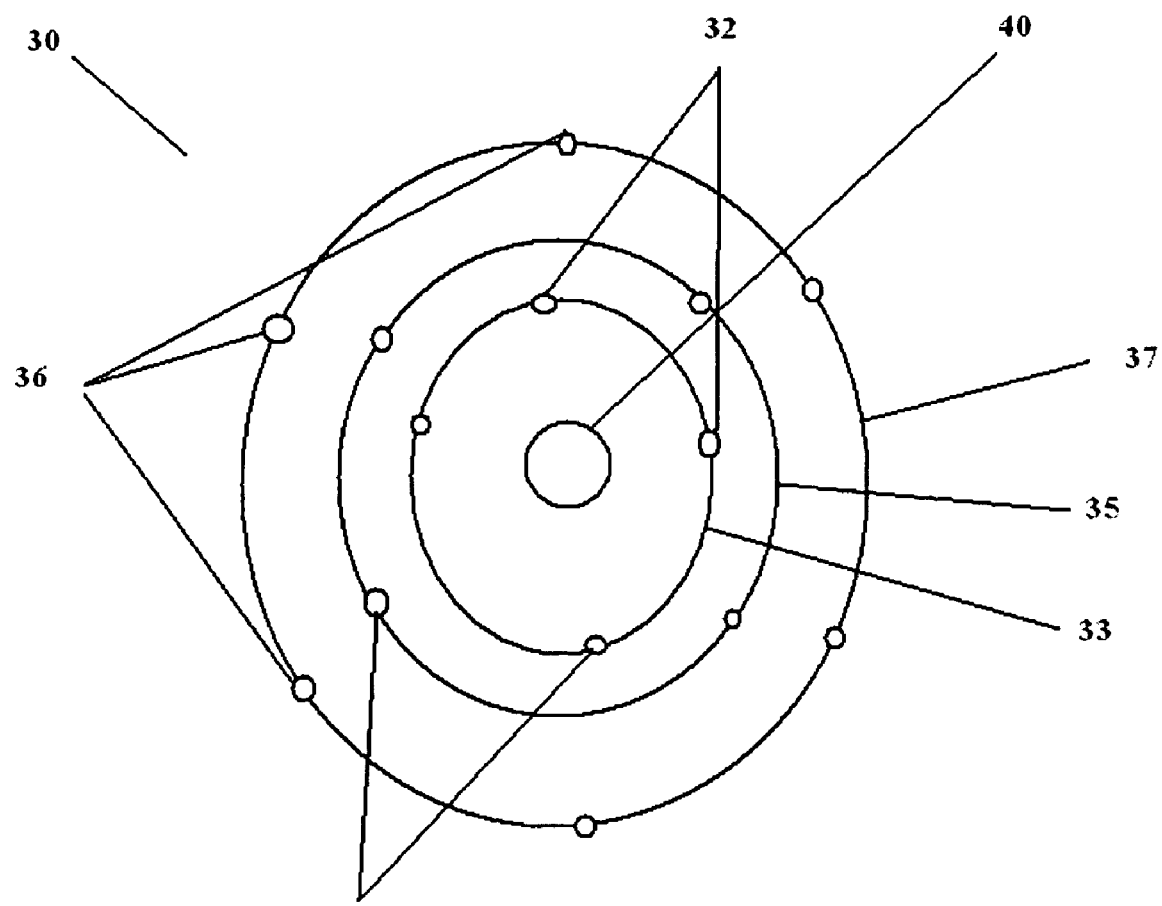
FIG. 2 is a top view of surface terminal receiver 30.

FIG. 2 is a top view of surface terminal receiver 30. Coil antennas 32 are connected together to form a generally circular shape 33 around borehole 40. Coil antennas 34 are connected together to form a larger generally circular shape 35 around borehole 40. Coil antennas 36 are connected together to form a still larger generally circular shape 37 around borehole 40. The number of surface receivers required will depend on the volume of oil movement to be tracked during heat application by radio frequency energy and the desired image resolution.

The signals received by surface terminal 30 are processed based on the new EMIT method data processing procedure developed in reference. It includes EIT measurements of the boundary electric potentials as well as the surface received magnetic field. Both the electric and magnetic fields radiated by the antenna 22 are sensed at the surface and processed by the new method. In the alternative, the system could have separate electric field and magnetic field sensors at the surface. However, it simplifies the hardware requirement to combine both measurements into a single antenna that is sensitive to both magnetic and electric field components.

Figure 3:
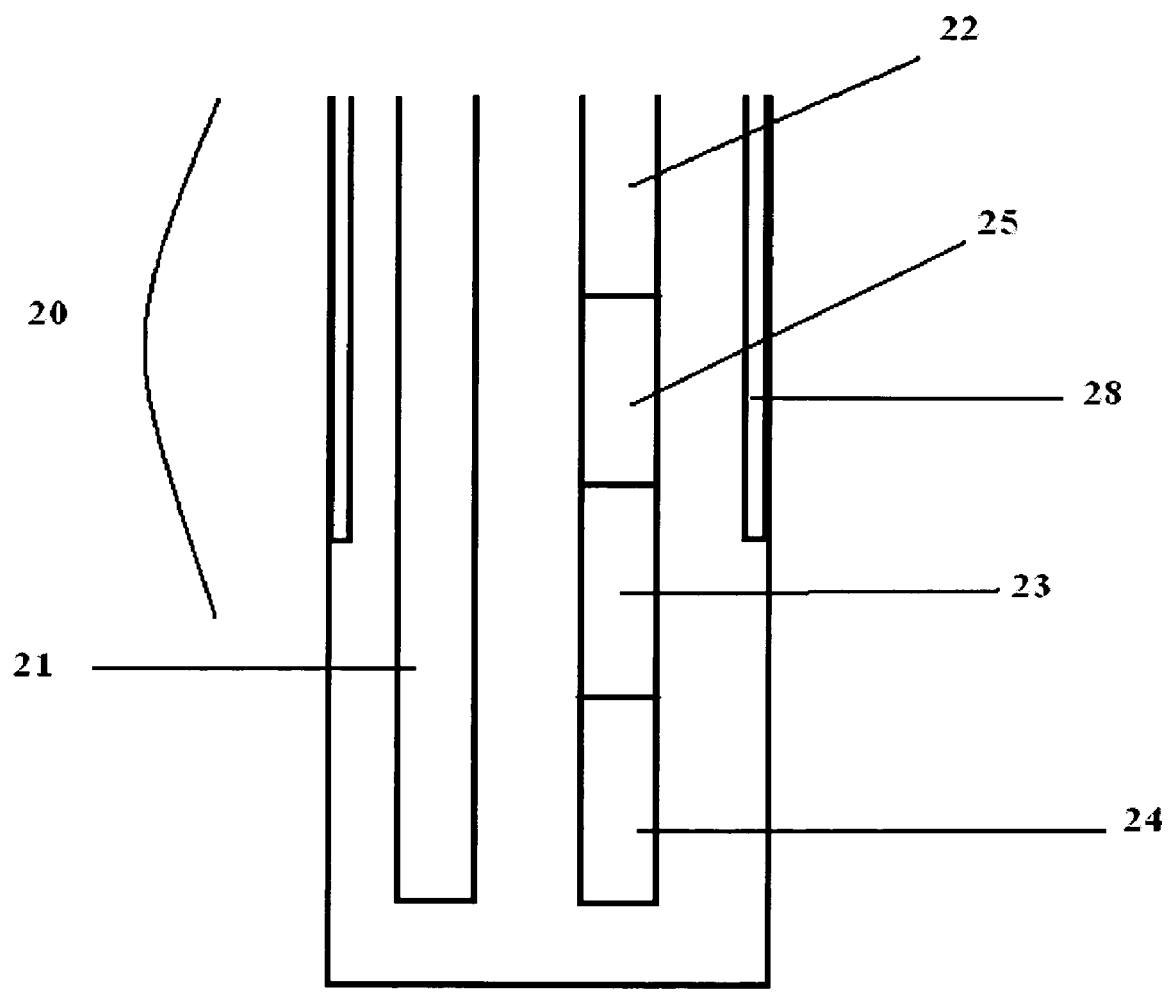
FIG. 3 is a perspective view of bottom terminal 20.

FIG. 3 is a perspective view of bottom terminal 20. Downhole solenoid antenna 22 is approximately 28 feet long. It is protected by a non-conducting cover which is resistant to abrasion and shock, but does not shield electromagnetic signals. The terminal 20 is below well casing 28, thus eliminating attenuation which coils accrue if it were enclosed by the casing. Radiated signals are propagated upwards in a rotationally symmetric pattern at low carrier frequency (1 kHz–1 MHz range). Antenna 22 can be positioned in the borehole containing a high power antenna for creating heat for oil treatment but located several feet below it or positioned in a nearby well at the same depth as the high power transmitter. The signal may be analog or digital.

Antenna 22 contains a battery pack 25 for transmitter power. It is designed to both receive and transmit signals. The antenna transmitter 23 located in borehole 20 at the required depth is a solid state unit that may be hardwired from the surface or contain battery power. Antenna receiver 24 is positioned lower than the transmitter 23. EMIT signals are transmitted to the surface terminal 30. Antenna 22 operates at very low frequency and power for EMIT. It is desirable to have a maximum of radiation efficiency while keeping the cylinder diameter in the practical range of two to four inches.

Antenna 22 is basically a copper wire winding around a high permeability core. Since the antenna is used for both transmission and reception, the core material must have a high saturation flux density as well as high initial magnetic permeability. A class of alloys for this requirement contains 47% to 50% nickel, the balance iron. Allegheny 4750 alloy is an example. A complete theoretical description of the radiated fields may be found in the Handbook of Electromagnetic Propagation in Conducting Media by Martin B. Kraichman, Headquarters Naval Material Command,1970. NAVMAT P-2302.

Finally, it should be noted that the solenoid-type antenna 22 is just one example of many possible types. An antenna structure patented by Kasevich may be used effectively to separately receive electric and magnetic fields from the wave passing by using essentially a hybrid structure sensitive to the electric field in one direction and the magnetic field in a cross polarized direction.

An alternative approach to transmission from a downhole antenna can be had by using the same radio frequency borehole antenna that is being employed for thermal upgrading of the heavy oil. For these purposes, a magnetic dipole or helical antenna at the end of a coaxial transmission line in a well may be used for heating purposes. During a brief power shutdown period, a low frequency EMIT signal could be transmitted to the helical antenna and cause it to radiate energy to the surface as an electrically short magnetic dipole. The magnetic field of the radiation would be received by the surface terminal 30 and that information would be processed to develop an image of the heated oil movement and temperature distribution since temperature has a direct effect on the formation resistivity.

In use, a user of an embodiment of the present invention would place an antenna in a borehole in an area in which imaging was to be done. The user would then place concentric rings of coil antennas on the surface around the borehole. The user then transmit low frequency and power EMIT signals from the borehole antenna to the surface receivers. The signals received by surface receivers are then processed by making EIT measurements of the boundary electric potentials as well as the surface received magnetic field. Both the electric and magnetic fields radiated by the borehole antenna are sensed at the surface and processed by the EMIT method. In this way, an image of the subsurface conditions and materials is created.

Although the present invention has been described with reference to preferred embodiments, persons skilled in the art will recognize that changes may be made in form and detail without departing from the spirit and scope of the invention.

What is claimed is:

1. A system for use in creating images of subsurface materials or structures by electromagnetic impedance tomography, the system comprising:
    an antenna positioned within a borehole drilled within an area designated for imaging, the antenna comprising:
        a transmitter for transmitting electromagnetic impedance tomography signals to the surface of the area designated for imaging; and
        a power supply unit to supply power to the transmitter;
    a surface terminal positioned on the surface of the area designated for imaging, the surface terminal comprising:
        coil antennas for receiving the transmissions of electromagnetic impedance tomography signals from the transmitter, the coil antennas connected to one another and arranged concentrically in generally circular shapes around the borehole; and
    a signal processing unit for processing the electromagnetic impedance tomography signals received by the coil antennas and creating images of subsurface materials or structures.

2. The system of claim 1 wherein the transmitter is supplied with power through hardwiring to a power source on the surface of the area designated for imaging.

3. The system of claim 1 wherein the coil antennas are arranged in at least two concentric generally circular shapes.

4. The system of claim 1 in which the borehole antenna is positioned in a borehole containing an antenna for creating heat to heat the surrounding materials.

5. The system of claim 1 in which the borehole antenna is also used to create heat to heat the surrounding materials.

6. A system for use in creating images of subsurface materials or structures by electromagnetic impedance tomography, the system comprising:
    an antenna positioned within a borehole drilled within an area designated for imaging, the antenna comprising:
        a transmitter for transmitting electromagnetic impedance tomography signals to the surface of the area designated for imaging; and
        a power supply unit to supply power to the transmitter;
    a surface terminal positioned on the surface of the area designated for imaging, the surface terminal comprising:
        a first array of coil antennas for receiving electrical signals from the transmitter, the coil antennas connected to one another and arranged concentrically in generally circular shapes around the borehole; and
        a second array of coil antennas for receiving magnetic signals from the transmitter, the coil antennas connected to one another and arranged concentrically in generally circular shapes around the borehole; and
    a signal processing unit for processing the electromagnetic impedance tomography signals received by the coil antennas and creating images of subsurface materials or structures.

7. The system of claim 6 wherein the transmitter is supplied with power through hardwiring to a power source on the surface of the area designated for imaging.

8. A system for use in creating images of subsurface materials or structures by electromagnetic impedance tomography, the system comprising:
    two or more antennas positioned within a borehole drilled within an area designated for imaging, the antenna comprising:
        a transmitter for transmitting electromagnetic impedance tomography signals to the surface of the area designated for imaging; and
        a power supply unit to supply power to the transmitter;
    a surface terminal positioned on the surface of the area designated for imaging, the surface terminal comprising:
        coil antennas for receiving the transmissions of electromagnetic impedance tomography signals from the transmitter, the coil antennas connected to one another and arranged concentrically in generally circular shapes around the borehole; and
    a signal processing unit for processing the electromagnetic impedance tomography signals received by the coil antennas and creating images of subsurface materials or structures.

9. The system of claim 8 in which the two or more antennas positioned within the borehole are arranged in an array to create desired heating patterns.

* * * * *